(12) United States Patent
Chen et al.

(10) Patent No.: US 9,932,850 B2
(45) Date of Patent: Apr. 3, 2018

(54) CORRECTION SYSTEM AND METHOD FOR GAS TURBINE PROPORTIONAL DROOP GOVERNOR

(71) Applicant: General Electric Company, Schenectady, NY (US)

(72) Inventors: Yuhui Chen, Roanoke, VA (US); Bryan Edward Sweet, Schenectady, NY (US); Scott William Szepek, Schenectady, NY (US)

( * ) Notice: Subject to any disclaimer, the term of this patent is extended or adjusted under 35 U.S.C. 154(b) by 445 days.

(21) Appl. No.: 14/612,491

(22) Filed: Feb. 3, 2015

(65) Prior Publication Data

US 2016/0222816 A1    Aug. 4, 2016

(51) Int. Cl.
| | | |
|---|---|---|
| F01D 17/04 | (2006.01) |
| F01D 15/10 | (2006.01) |
| F01D 21/00 | (2006.01) |
| F02C 9/28 | (2006.01) |
| F02C 9/32 | (2006.01) |

(52) U.S. Cl.
CPC ............ *F01D 17/04* (2013.01); *F01D 15/10* (2013.01); *F01D 21/003* (2013.01); *F02C 9/28* (2013.01); *F02C 9/32* (2013.01); *F05D 2220/764* (2013.01); *F05D 2270/024* (2013.01); *F05D 2270/061* (2013.01); *F05D 2270/701* (2013.01)

(58) Field of Classification Search
CPC ........ F01D 17/04; F01D 15/10; F01D 21/003; F02C 9/28; F02C 9/32; F02C 9/48; F02C 9/56; F02C 9/46; F05D 2220/764; F05D 2270/024; F05D 2270/061; F05D 2270/701; F05D 2270/091; F05D 2270/335; F05D 2270/304; F05B 2220/704; F05B 2220/706
USPC ...... 60/773, 793, 39.24, 39.281, 784; 290/7, 290/40 R, 40 A, 40 B, 40 C, 40 D, 51, 52
See application file for complete search history.

(56) References Cited

U.S. PATENT DOCUMENTS

| | | |
|---|---|---|
| 4,188,781 A | 2/1980 | Johnson et al. |
| 5,761,895 A | 6/1998 | Chu et al. |
| 6,118,187 A | 9/2000 | Hepner et al. |

(Continued)

FOREIGN PATENT DOCUMENTS

| | | |
|---|---|---|
| EP | 0425835 A2 | 5/1991 |
| EP | 1995867 A1 | 11/2008 |

OTHER PUBLICATIONS

EP Search Report and Written Opinion issued in connection with corresponding EP Application No. 16153235.3 dated Jun. 23, 2016.

*Primary Examiner* — Phutthiwat Wongwian
*Assistant Examiner* — Loren Edwards
(74) *Attorney, Agent, or Firm* — Fletcher Yoder, P.C.

(57) ABSTRACT

A method, including receiving a turbine system operating parameter. The turbine system operating parameter includes an indication of a frequency variation of an electric power system associated with the turbine system. The method includes determining a correction factor to vary the output of the turbine system according to the frequency variation, wherein the correction factor is based on a droop power response and a nominal droop power ratio. The droop power response is calculated based on a gas turbine power output and a speed-load error. The method further includes varying the output of the turbine system based at least in part on the correction factor.

18 Claims, 4 Drawing Sheets

(56) References Cited

U.S. PATENT DOCUMENTS

| | | | | |
|---|---|---|---|---|
| 8,463,451 B2* | 6/2013 | Kumula | ............... | F01D 15/10 700/287 |
| 8,768,529 B2* | 7/2014 | Mosley | ............... | H02P 9/04 290/40 B |
| 2014/0060065 A1 | 3/2014 | Sweet et al. | | |
| 2014/0260293 A1 | 9/2014 | Chen et al. | | |

* cited by examiner

CORRECTION SYSTEM AND METHOD FOR GAS TURBINE PROPORTIONAL DROOP GOVERNOR

BACKGROUND

The subject matter disclosed herein relates to industrial control systems, and more specifically, to droop response control industrial control systems for turbines.

Systems delivering fuel to gas turbines, that are producing power for purpose of generating electricity, often must comply with regulations that dictate specific power responses to changes in the system frequency of an electrical power grid. If frequency decreases then the governor of each gas turbine must compensate by increasing fuel flow to produce a proportional power response in order to contribute to grid frequency control. This compensation is often described as "droop" control in the electrical power producing industry.

The droop control system is called a "proportional droop governor" (or "proportional droop control system") if a proportional controller is used rather than a proportional integral (PI) or proportional integral differential (PID) controller. The proportional droop governor is simple and robust, and has been used in power generating equipment. However, for this type of droop governor, the droop power response to a power grid frequency variation is not consistent and is dependent on ambient operating conditions, machine performance degradation and turbine initial load levels. The droop power response in some conditions could fail to meet grid authority's requirement due to this variation.

The present disclosure addresses this issue by correcting the traditional fuel flow command from the proportional droop governor, thereby making the droop power response more consistent and predictable on frequency variation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a controller configured to control an operational behavior of a turbine system, including a droop response system configured to detect one or more operational characteristics of the turbine system as an indication of a frequency variation of an electric power system associated with the turbine system, wherein the droop response system is further configured to generate a response to vary an output of the turbine system in response to the indication of the frequency variation, and a proportional droop correction control system configured to determine a correction factor based on a droop power response and a nominal droop power ratio, wherein the droop power response is calculated based on a gas turbine power output and a speed-load error, and generate the correction factor to apply to the response generated by the droop response system, wherein the correction factor is configured to correct the response generated by the droop response system.

In another embodiment, a method includes receiving a turbine system operating parameter, wherein the turbine system operating parameter comprises an indication of a frequency variation of an electric power system associated with the turbine system, determining a correction factor to vary the output of the turbine system according to the frequency variation, wherein the correction factor is based on a droop power response and a nominal droop power ratio, wherein the droop power response is calculated based on a gas turbine power output and a speed-load error, and varying the output of the turbine system based at least in part on the correction factor.

In a further embodiment, a non-transitory computer-readable medium includes computer executable code stored thereon, the code comprising instructions to receive a turbine system operating parameter, wherein the turbine system operating parameter comprises an indication of a frequency variation of an electric power system associated with the turbine system, generate a correction factor to apply to a response generated to vary the output of the turbine system according to the frequency variation, wherein the correction factor is based on a nominal droop power ratio and a droop power response, wherein the nominal droop power ratio comprises a rated gas turbine output and a preset droop level, and wherein the droop power response comprises a gas turbine power output and a speed-load error, and vary the output of the turbine system according to the corrected response.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to systems and methods useful in controlling the droop response (i.e. how a system responds to a "droop" in the system of an electrical power grid) of, for example, a gas turbine system. As used herein, "droop" may refer to a degree of frequency (e.g., speed) variation that may be necessary to cause a power generating prime mover (e.g., turbines, generators, and so forth) to compensate for a corresponding frequency (e.g., electrical frequency) variation of an electrical power grid that may be coupled to the power generating prime mover. Indeed, because the power output of gas turbine systems may, in response to power grid frequency variation, depend upon the ambient operating conditions (e.g., inlet temperature, pressure, and so forth), machine performance degradation (e.g. turbine efficiency) and the initial load levels of the gas turbine system, certain errors may occur in the droop response control of the gas turbine system. This may result in the gas turbine system and generator failing to comply with certain nationally and/or regionally mandated power generation and transmission quality assurance (QA) standards, codes, and/or requirements governing such systems. Accordingly, a proportional droop correction control system is provided.

The proportional droop correction control system may enable the droop response of the gas turbine system to be invariant and repeatable. Although, the presently disclosed embodiments may be discussed primarily with respect to a gas turbine system, it should be appreciated that the presently disclosed embodiments may apply to any power generating system including steam turbine systems, wind turbine systems, hydroelectric power generating systems, geothermal power generating systems, and the like.

Figure 1:
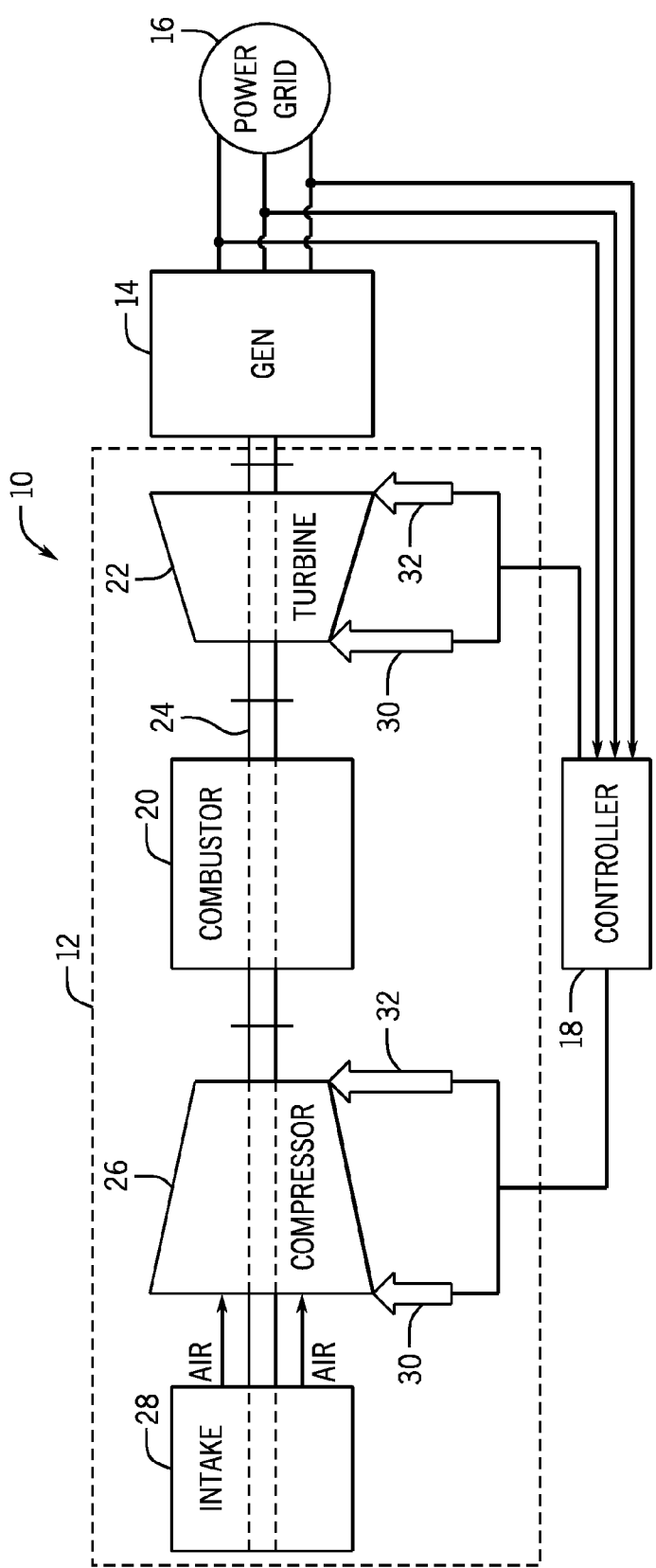
FIG. 1 is a block diagram of an embodiment of a power generation system including a controller, in accordance with present embodiments.

With the foregoing in mind, it may be useful to describe an embodiment of a power generation system incorporating techniques disclosed herein, such as an industrial power generation system 10 illustrated in FIG. 1. As depicted, the system 10 may include a gas turbine system 12, a generator 14, a power grid 16, and a controller 18. The gas turbine system 12 may further include a combustor 20, a turbine 22, a compressor 26, and an intake 28. The combustor 20 may receive fuel that may be mixed with air, for example, to create combustion in a chamber within the combustor 20. The combustor 20 may create hot pressurized exhaust gases. The combustor 20 may then direct the exhaust gases through the turbine 22 toward one or more exhaust outlets. Thus, the turbine 22 may be part of a rotor. As the exhaust gases pass through the turbine 22, the gases may force turbine blades to rotate a drive shaft 24 along an axis of the gas turbine system 12. As will be discussed in further detail, the drive shaft 24 may be coupled to various components of the system 10, including not only components of the gas turbine system 12, but also the generator 14. In certain embodiments, operational parameters (e.g., pressure, temperature, speed, torque, and so forth) may be sensed or estimated from one or more of the gas turbine system 12, the generator 14, and the drive shaft 24 to control droop response of the gas turbine system 12, as will be discussed in more detail with respect to FIG. 2 below.

The drive shaft 24 may include one or more shafts that may be, for example, concentrically aligned. The drive shaft 24 may include a shaft connecting the turbine 22 to the compressor 26 to form a rotor. Similarly, the compressor 26 may include blades coupled to the drive shaft 24. Thus, rotation of turbine blades in the turbine 22 causes the shaft connecting the turbine 22 to the compressor 26 to rotate blades within the compressor 20. Such a mechanism may compress air in the compressor 20. The rotation of blades in the compressor 26 may compress air that may be received via the air intake 28. The compressed air may be fed to the combustor 20 and mixed with fuel, for example, to allow for higher efficiency combustion. In certain embodiments, the gas turbine system 12 may also generate mechanical power to drive the generator 14 to produce electrical power for the power grid 16.

The gas turbine system 12 may further include a number of sensors and field devices configured to monitor various physical and operational parameters related to the operation and performance of the power generation system 10. The sensors and field devices may include, for example, inlet sensors and field devices 30 and outlet sensors and field devices 32 (e.g., pressure transmitters, temperature transmitters, flow transmitters, fuel sensors, clearance sensors, and the like). Although not illustrated, it should also be appreciated that the generator 14 may also include a number of sensors and field devices 30 and 32. The inlet sensors and field devices 30 and outlet sensors and field devices 32 may also measure environmental (e.g., ambient) conditions of the gas turbine system 12 and the generator 14.

For example, the inlet sensors and field devices 30 and outlet sensors and field devices 32 may measure the ambient temperature, ambient pressure, humidity, and air quality (e.g., particulate in air). The inlet sensors and field devices 30 and outlet sensors and field devices 32 may also measure engine parameters related to the operation and performance of the gas turbine system 12, such as, exhaust gas temperature, rotor speed, engine temperature, engine pressure, fuel temperature, engine fuel flow, exhaust flow, vibration, clearance between rotating and stationary components, compressor discharge pressure, pollution (e.g., nitrogen oxides, sulfur oxides, carbon oxides and/or particulate count), and turbine 22 exhaust pressure. Further, the sensors and field devices 30 and 32 may also measure actuator information such as valve position, switch position, throttle position, and a geometry position of variable geometry components (e.g., air inlet). As will be discussed in greater detail, the controller 18 may use the measurements to derive and generate a droop correction to actively control one or more of the gas turbine system 12 (e.g., turbine 22, compressor 26, intake 28) and the generator 14, and by extension, the electrical power output to the power grid 16.

In certain embodiments, the generator 14 may include one or more rotors (not illustrated), of which may rotate at a fixed and/or variable speed with respect to the operating frequency (e.g., approximately 50 Hz for most countries of Europe and Asia and approximately 60 Hz for countries of North America) of the power grid 16. In certain embodiments, variations in operating frequency of the power grid 16 may indicate that the power generation supply to the power grid 16 is inadequate to meet the load demand on the power grid 16, or otherwise that the power generation supply to the power grid 16 is more than the load demand on the power grid 16. In such cases, it may be useful to provide a control mechanism to vary the power output (e.g., fuel flow) of the gas turbine system 12, and by extension the generator 14, to compensate for the frequency variations on the power grid 16. Such a control mechanism may generally be referred to as the "droop response" of the gas turbine system 12. Specifically, the droop response of the gas turbine system 12, and by extension the generator 14, may be determined in terms of the percent frequency variation relating to a 100% change in gas turbine system 12 power output. For example, in one embodiment, the gas turbine system 12 and the generator 14 may be controlled to operate with a 4% droop response. That is, the power output of the gas turbine system 12 may experience a 100% change for a 4% variation in frequency of the power grid 16. Thus, a 4% droop definition may correspond to a gas turbine system 12 output change of 25% per each 1% power grid 16 frequency change (e.g., per each 1% turbine shaft 24 speed change since the power grid 16 frequency and turbine 22 speed may be proportional with respect to each other). As will be further appreciated, the droop response of the gas turbine system 12 may be controlled to compensate for variations in frequency and/or load of the power grid 16. Further, the droop response of the gas turbine system 12 may be controlled irrespective of the ambient conditions (e.g., temperature, pressure, and so forth), machine performance degradation (e.g. turbine efficiency) and initial load levels of the gas turbine system 12.

As previously noted, the system 10 may also include a controller 18. The controller 18 may suitable for generating and implementing various control algorithms and techniques to control droop response of the gas turbine system 12. The controller 18 may also provide an operator interface through which an engineer or technician may monitor the components of the power generation system 10 such as, components of the gas turbine system 12 and the generator 14. Accordingly, the controller 18 may include a processor that may be used in processing readable and executable computer instructions, and a memory that may be used to store the readable and executable computer instructions and other data. These instructions may be encoded in programs stored in tangible non-transitory computer-readable medium such as the memory and/or other storage of the controller 18. In certain embodiments, the controller 18 may also host various industrial control software, such as a human-machine interface (HMI) software, a manufacturing execution system (MES), a distributed control system (DCS), and/or a supervisor control and data acquisition (SCADA) system. The controller 18 may further support one or more industrial communications (e.g., wired or wireless) protocols such as, Hart and/or Wireless Hart. For example, the controller 18 may support GE Energy GE ControlST, which may assign and distribute configuration tools and similar control data to various field equipment and devices.

As such, the controller 18 may be communicatively coupled to the inlet and outlet sensors and field devices 30 and 32, gas turbine system 12, and the generator 14. The controller 18 may support one or more operating systems capable of running and supporting various software applications and systems, as well as managing the various hardware (e.g., processors, storages, gateways, programmable logic controllers [PLCs], and so forth) that may be included as part of the controller 18. Indeed, in certain embodiments, the controller 18 may support one or more droop response control systems and/or algorithms, such as a droop response control system 34.

Figure 2:
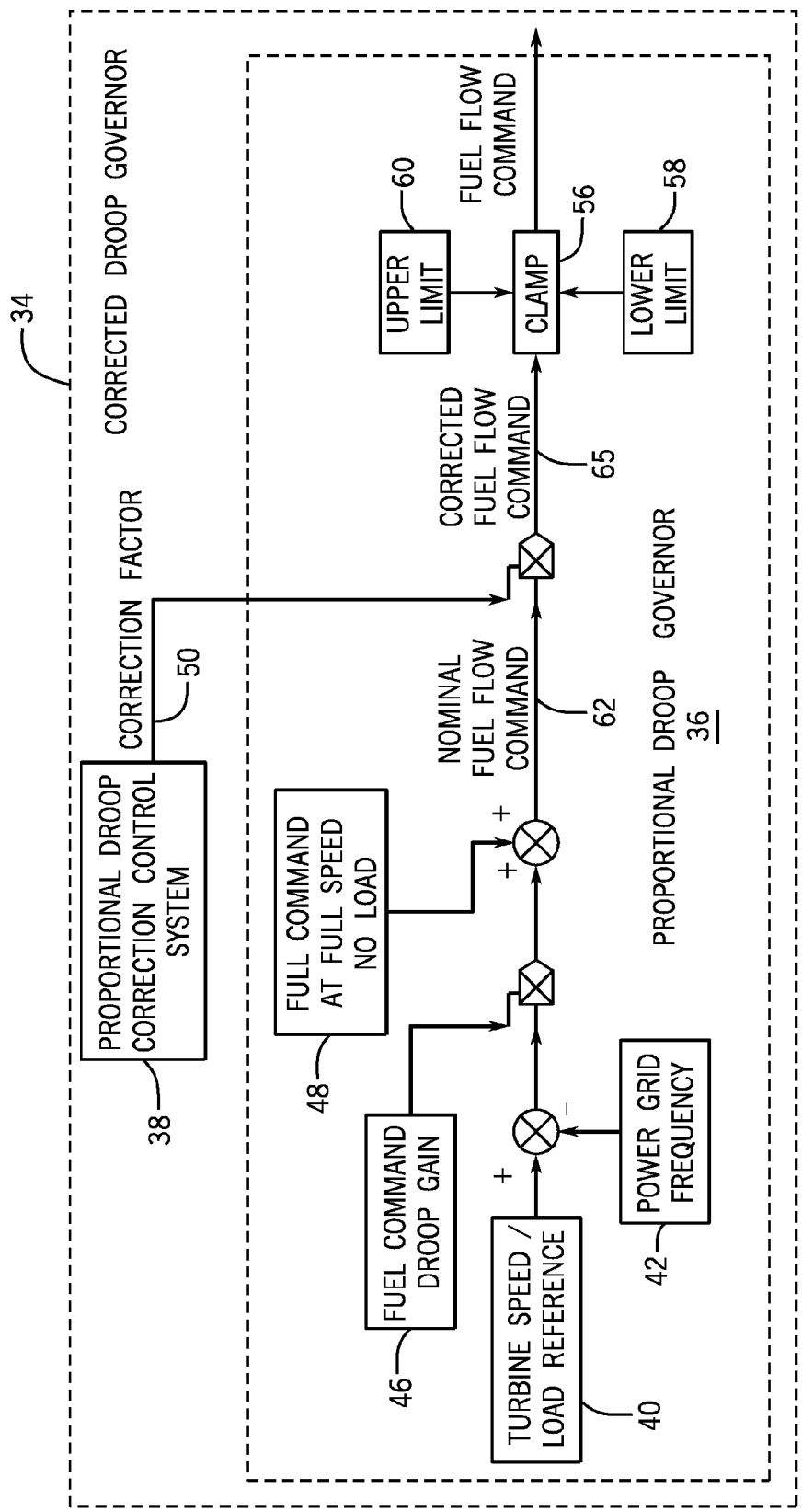
FIG. 2 is a block diagram of an embodiment of a droop response control system included within the controller of FIG. 1, in accordance with present embodiments.

Accordingly, FIG. 2 is a schematic diagram of an embodiment of a droop response control system 34. The droop response control system 34 may be included as part of the controller 18, and may further include a proportional droop governor 36 and a proportional droop correction control system 38. Particularly, the droop response control system 34 may be a software system, a hardware system, or a combination thereof. The droop response control system 34 may be used to control droop response, such that the gas turbine system 12 power output, and by extension the power output of the generator 14, is adjusted according to variations in electrical frequency of the power grid 16. Specifically, the droop response control system 34 may monitor the frequency (e.g., received by the controller 18) of the power grid 16 or the speed of the generator 14, and adjust the fuel flow to the gas turbine system 12 and the output of the generator 14 according to the degree of frequency variation from the nominal frequency (e.g., 60 Hz) of the power grid 16. For example, for a 0.1 Hz frequency increase (e.g., 60.1 Hz indicating that the power generation supply to the power grid 16 is more than the load demand on the power grid 16), the fuel flow and/or intake 28 of the gas turbine system 12 may be decreased to a reduced power output to maintain balance between the gas turbine system 12, the generator 14, and the power grid 16 of the system 10. In a similar example, for a 0.1 Hz frequency decrease (e.g., 59.9 Hz indicating that the power generation supply to the power grid 16 is less than the load demand on the power grid 16), the fuel flow and/or intake 28 of the gas turbine system 12 may be increased to a greater power output to maintain balance between the gas turbine system 12, the generator 14, and the power grid 16 of the system 10.

As depicted, the proportional droop governor 36 may include a turbine speed/load reference input 40 and operating frequency input 42. As previously noted with respect to FIG. 1, the inputs 40 and 42 may be received by the controller 18 via, for example, the inlet sensors and field devices 30 and outlet sensors and field devices 32 or other devices. As it may be worth noting, the frequency input 42 may be an electrical frequency measured directly from the power grid 16, or derived based on the speed of the shaft 24 coupled to the gas turbine system 12 and the generator 14. Specifically, the turbine speed/load reference input 40 may be the turbine 26 speed/load reference represented as a percentage value. For example, a 100% value represents rated speed and a zero power output (MW) and a 104% value represents full-power output (MW) at a nominal 4% droop setting. Similarly, the operating frequency input 42 may be represented as percentage value, in which each 1% variation in power grid 16 frequency may correspond to a 25% change in power output (MW) of the gas turbine system 12 at a nominal 4% droop setting. Thus, as illustrated, a difference of the inputs 40 and 42 may be computed to calculate a speed/load error percentage, which may be multiplied by a fuel command droop gain 46. The fuel command droop gain 46 may represent the fuel command change per each percentage of the speed/load error. The result of the product of the speed/load error percentage and the fuel command droop gain 46 may be then combined with a fuel command constant 48 (e.g., the fuel command at full-speed and no load of the generator 14) to derive a nominal fuel flow command 62. After passing through a clamp 56 with authority limits 58 and 60, the nominal fuel flow command may be then output to one or more effectors (e.g., actuators, valves, and the like) of the gas turbine system 12 to adjust the fuel flow to the gas turbine systems 12, and by extension, control the droop response of the gas turbine system 12.

However, because the power response of the gas turbine system 12 may depend upon the ambient operating conditions (e.g., compressor 26 inlet temperature and pressure), machine performance degradation (e.g. turbine efficiency) and the initial load levels of the gas turbine system 12, certain errors may occur in the droop response control of the gas turbine system 12. For example, as a 1% power grid 16 frequency variation may necessitate a 10 MW adjustment in gas turbine system 12 power output, depending on the ambient conditions (e.g., on a cold or hot day as compared to a day of normal temperature, and/or cooler or warmer periods of a single day), the 1% power grid 16 frequency variation may, for example, result in a droop response change of 11-12 MW on a cold (e.g., 50-70 degrees) day or a change of 8-9 MW on a hot (e.g., 80-100 degrees) day. This may result in the gas turbine system 12 and generator 14 failing to comply with certain nationally and/or regionally mandated power generation and transmission quality assurance (QA) standards, codes and/or requirements governing such systems.

Accordingly, it may be useful to provide a proportional droop correction control system 38. Indeed, the proportional droop correction control system 38 may adjust the nominal fuel flow command, such that for a given variation in frequency of the power grid 16, the droop power response (e.g., the actual droop power ratio) may be irrespective of the ambient operating conditions (e.g., compressor 26 inlet temperature and pressure), machine performance degradation (e.g. turbine efficiency) and the initial load levels of the gas turbine system 12. Thus, the proportional droop correction control system 38 may enable the frequency droop response of the gas turbine system 12 to be consistent and repeatable throughout, for example, periods of quality assurance (QA) testing, safety integrity level (SIL) testing, operation, and the like. The proportional droop correction control system 38 may output a correction factor 50 that may be multiplied by the nominal fuel flow command 62 resulting in a corrected fuel flow command 65. As shown in FIG. 2, the corrected fuel flow command 65 may be passed to a clamp 56. The clamp may provide an upper limit 60 and/or a lower limit 58 to include an upper bound and/or a lower bound to the fuel flow command.

One method of determining a correction factor 50 is to account for ambient operating conditions (e.g., inlet temperature and pressure, and so forth) with a pre-calculated parameter lookup table. The lookup table takes account of the various temperatures and pressures to produce a correction factor. However, using a lookup table may include lots of pre-configuration for different parameters, which may be undesirable and difficult to manage. Thus the proportional droop correction control system 38 provides a simpler and more robust solution to provide a normalized response and account for ambient operating conditions. Additionally, the solution does not need to use a value from a megawatt sensor as a parameter for correction. Thus, one of the benefits of the proportional droop correction control system 38 is that it provides a correction factor without having to use a measurement from a megawatt sensor (e.g., provides a correction factor without a generator output in the control loop for correction).

Figure 3:
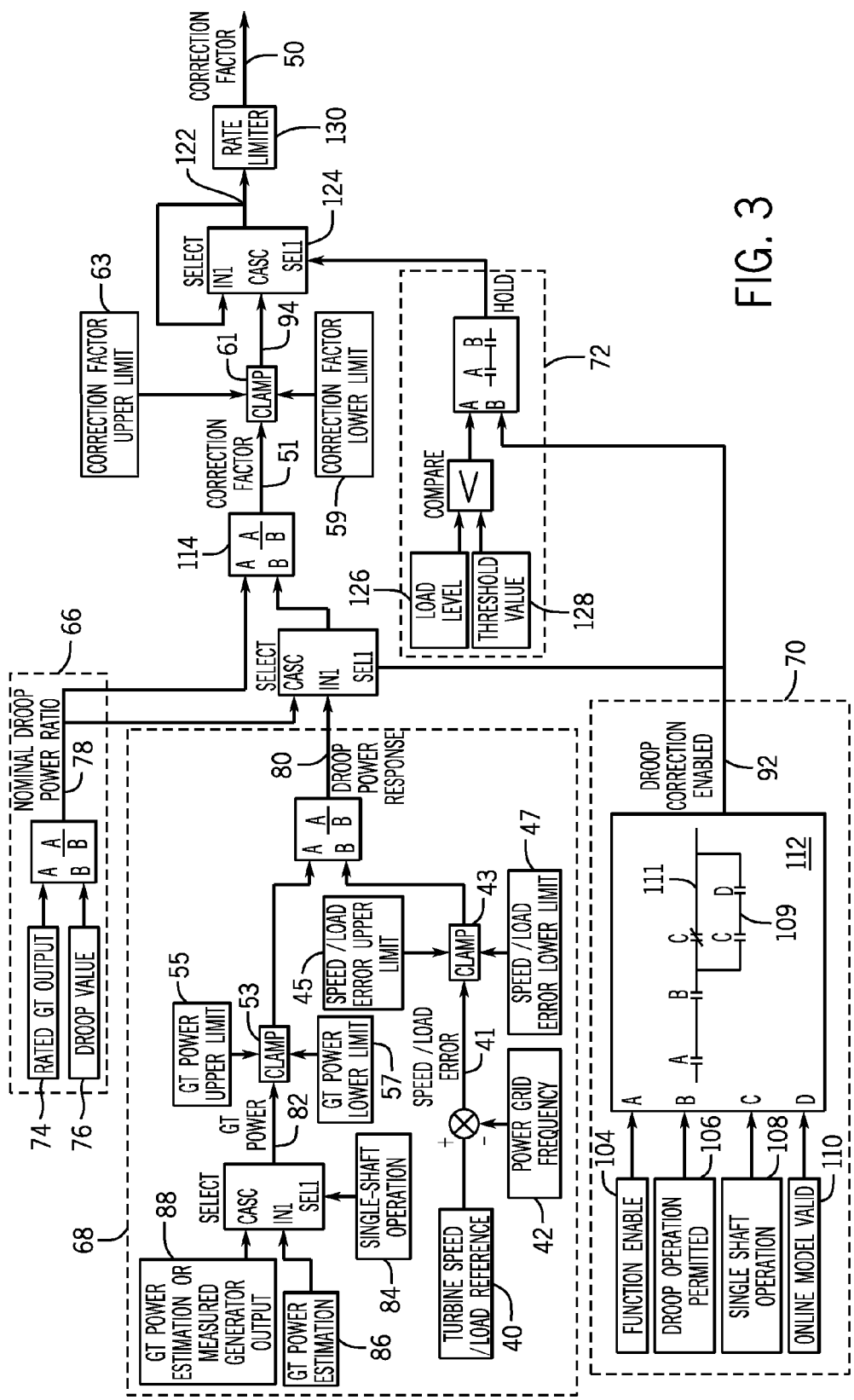
FIG. 3 is a block diagram of an embodiment of a proportional droop correction control system included within the droop response control system of FIG. 2.

FIG. 3 is a schematic diagram of the proportional droop correction control system 38. As shown in FIG. 3, the output of the proportional droop correction control system 38 is the correction factor 50 also shown in FIG. 2. The proportional droop correction control system 38 includes four general sections: a nominal droop power ratio section 66, a measured section 68, an enable section 70, and hold section 72.

The nominal droop power ratio section 66 uses inputs that are generally constant values. The preset section 66 includes a rated gas turbine output value 74 and a droop value 76. The rated gas turbine output value may be the gas turbine rated (e.g., guaranteed) megawatt output at base load (e.g., 400 MW). The droop 76 may be a preset value that describes how fast the power plant should react to frequency variation. For instance, if the droop value is preset as 4, it means if there is a 1% speed variation, the power generation should change by 25%. The droop 76 may, for instance, be defined by a region. As such, the droop 76 may be viewed in this context as generally a constant value. The rated gas turbine output 74 and the droop 76 are combined (e.g., multiplied or divided) to result in a nominal droop power ratio 78. The nominal droop power ratio is the target to which the droop power response 80 is controlled.

The measured section 68 is used to produce the droop power response 80. The measured section 68 of the proportional droop correction control system 38 includes a gas turbine power output 82. The gas turbine power output 82 is determined based on plant configuration. For single shaft operation where a steam turbine and the gas turbine 12 share the same electrical generator 14, an online model estimation 86 of the gas turbine 12 contribution is used as the gas turbine power output 82. Otherwise, either the gas turbine power estimation or the measured generator power output 88 may be used as the gas turbine power output 82. Accordingly, the measured generator output can be used (i.e. but not have to be used) if it is not in single shaft operations. The gas turbine power output 82 includes a clamp 53 to provide authority limits (e.g., an upper limit 55 and a lower limit 57). The gas turbine power output 82 may then be used with other values to calculate the droop power response 80.

The measured section 68 of the proportional droop correction control system 38 may include the turbine speed/load reference 40 and the power grid frequency 42. These values may be the same values as those in FIG. 2 (e.g., retrieved from the memory of the controller 18 or received from the same sensors). As described above, the speed-load error is calculated based on the speed/load reference 40 and the power grid frequency 42. Similar to above, the difference of the inputs 40 and 42 may be computed to calculate a speed/load error percentage 41, which may be limited by another clamp 43 with an upper limit 45 and a lower limit 47. The speed-load error 41 and the gas turbine power output 82 may then be used (e.g., multiplied or divided) to calculate the droop power response 80. The droop power response 80 and the nominal droop power ratio 78 may then be used (e.g., multiplied or divided) in block 114 to calculate a correction factor (e.g., first correction factor or initial correction factor) when droop correction is enabled 92 in the enable section 70.

Droop correction may be enabled 92 in a variety of circumstances. In an embodiment, an enabling bit 104 is turned on and a droop operation is permitted 106 (e.g., the gas turbine system 12 is connected to the grid 16). Additionally, either one of two cases may be true to enable droop correction: (1) in single shaft operation 108, and the online model is valid 110, as indicated by C and D 109; or (2) not in single shaft operation 111 (e.g. generator is only driven by gas turbine). As shown in FIG. 3, block 112 reflects the logic described above. While an embodiment may use the logic described in FIG. 3, this disclosure is not meant to be limiting as such, and any method of determining that droop correction enabling/disabling may be used.

As mentioned above, when droop correction is enabled 92, the nominal droop power ratio 78 may be divided by the droop power response 80 to determine the initial correction factor 51. When droop correction is disabled, the nominal droop power ratio 78 may be divided by itself so that no correction factor (e.g., correction factor=1) is used. The correction factor 51 may then be limited by a clamp 61 (e.g., authority limits) with an upper limit 63 and a lower limit 59 (e.g., second or intermediate correction factor). The correction factor at point 122 may either be the new generated correction factor 51 or a previously held correction factor in latch 124. As shown in FIG. 3, the latch 124 is shown to reflect that the correction factor at point 122 may be held based on the hold section 72.

The hold section 72 is used to determine when the correction factor at point 122 should be updated to the new correction factor 51 or when it should be repeatedly held. When a load level 126 of the hold section 72 corresponding to the load of the gas turbine system 12 drops below a threshold value 128, it may be beneficial to keep using a prior correction factor 124 as the correction factor 50 (instead of updating to the correction factor at point 94), because the algorithm described above may be better utilized with higher loads. As such, the hold section 72 may include a load level 126 of the turbine system 12 and a threshold value 128 corresponding to a low load level (e.g., 100.15%). When the load level 126 is above the threshold value 128, the new correction factor at point 94 is used as the correction factor at point 122 and passes through a rate limiter 130 to output the final correction factor 50. The rate limiter 130 may limit the rate of change of the final droop correction factor 50. While the clamp 61, the latch 124, and the rate limiter 130 are used, these components are being used as an example. Additional and/or alternative methods may be used to adjust the droop correction factor to a desirable level based on the nominal droop power ratio and the droop power response.

Figure 4:
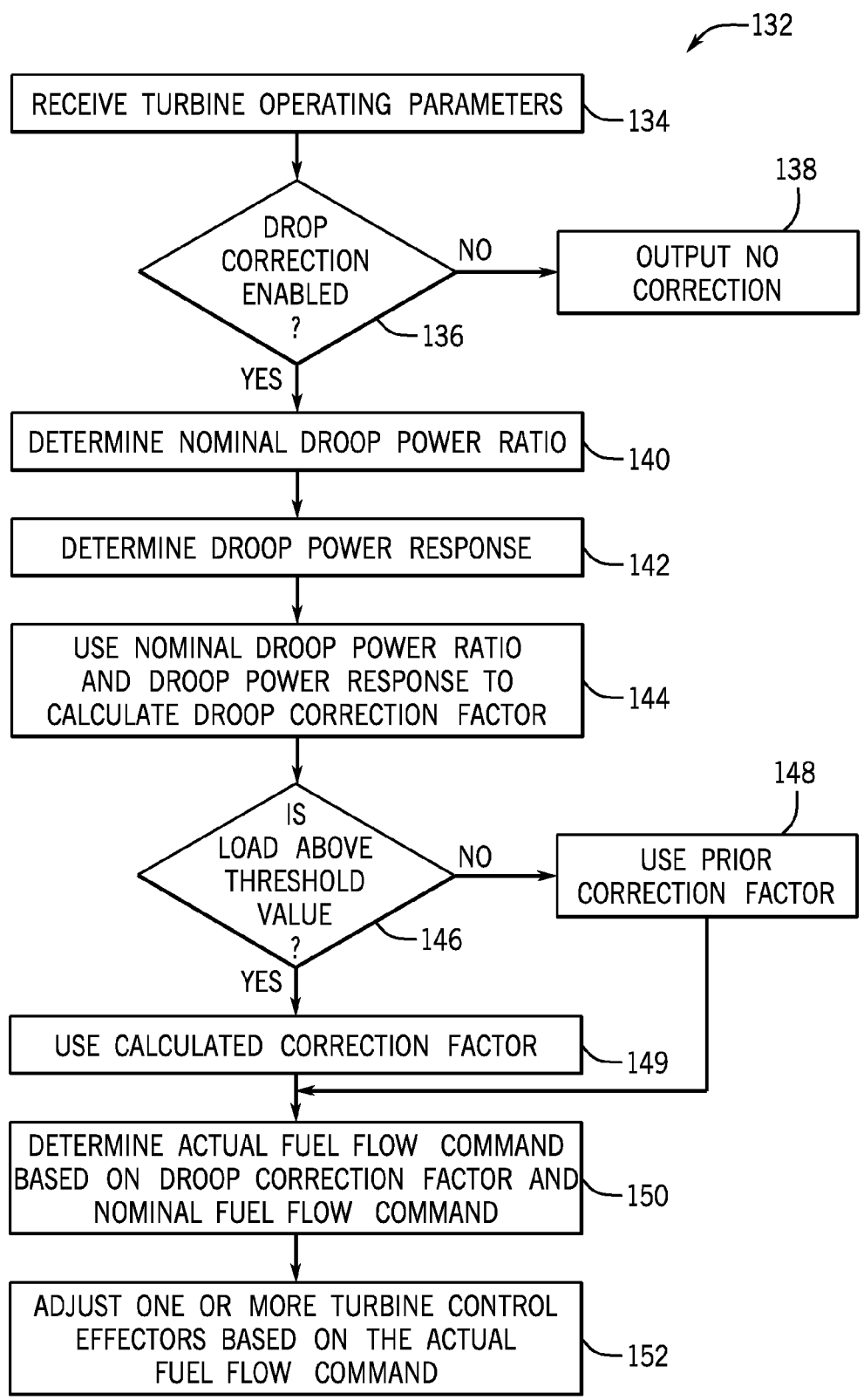
FIG. 4 is a flow chart of an embodiment of a process suitable for implementing droop response control system of FIG. 2, in accordance with present embodiments.

Turning now to FIG. 4, a flow diagram is presented, illustrating an embodiment of a process 132 useful in determining a fuel flow command by using, for example, the controller 18 included in the power generation system 10 depicted in FIG. 1. The process may include code or instructions stored in a non-transitory computer-readable medium (e.g., a memory) and executed, for example, by one or more processors included in the controller 18. The process 132 may begin with the controller 18 receiving (block 134) the gas turbine system 12 operating parameters. The operating parameters may include the rated gas turbine output 74, droop 76, gas turbine power estimation or measured generator output 88, gas turbine power estimation 86, turbine speed/load reference 40, power grid frequency 42, load level 126, threshold value 128, enable setting 104, droop permitted setting 106, whether single shaft operation 108 is true, whether the online model is valid 110, or the like. As previously discussed, the controller 18 may receive the droop correction enabled 104 bit, the droop operation permitted 106 bit, the single shaft operation 108 bit, and/or the online model valid 110 bit to determine whether (block 136) to enable/disable droop correction. If droop correction is disabled, the system outputs no correction (block 138). This may be performed by taking the nominal droop power ratio and dividing it by itself instead of the droop power response, as shown in FIG. 3.

If droop correction is enabled, the controller 18 may then determine (block 140) the nominal droop power ratio 78. The nominal droop power ratio 78 may be the rated gas turbine output 74 divided by the droop 76. Additionally, the controller 18 may determine (block 142) the droop power response 80 (e.g., the actual droop power ratio). The droop power response 80 may be, for instance, the gas turbine power estimation 86 when in single shaft operation 84 divided by the speed/load error percentage (found using the difference between turbine speed/load reference 40 and the power grid frequency 42). Other details, such as using the measured generator output 88, are described above with respect to FIG. 3. The controller 18, via the processor, may then use (block 144) the nominal droop power ratio 78 and the droop power response 80 to find the droop correction factor 50 (e.g., initial and/or second correction factor). This may be done by dividing the nominal droop power ratio 78 by the droop power response 80. The controller 18 may then determine (block 146) if the load level 126 of the gas turbine system 12 is above a threshold value 128. If the load is too low, the controller 18 may use (block 148) a prior correction factor. If the load level 126 is above the threshold value 128, the controller 18 may use (block 149) an updated correction factor. Then the controller may determine (block 150) the actual fuel flow command based on the droop correction factor and the nominal fuel flow command. The controller may then adjust (block 152) one or more turbine control effectors based on the actual fuel flow command.

Technical effects of the present embodiments may include systems and methods useful in controlling the droop response of gas turbine systems of power generation systems. Specifically, a proportional droop correction control system may adjust the normal fuel flow command, such that for a given variation in frequency of the electrical power grid coupled to the gas turbine system, the droop power response may be irrespective of the ambient operating conditions, the machine performance degradation and the initial load levels of the gas turbine system. Additionally, the proportional droop correction control system may be used to make determinations without a lookup table that uses many preset values resulting in a more complex system. Thus, the proportional droop correction control system may provide an elegant solution to enable the droop response of the gas turbine system to be invariant and repeatable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
a droop response system configured to detect one or more operational characteristics of a turbine system as an indication of a frequency variation of an electric power system associated with the turbine system, wherein the droop response system is further configured to generate a nominal fuel flow command that adjusts fuel flow of the turbine system to control the droop response in proportion to the frequency variation; and
a proportional droop correction control system configured to:
determine a correction factor based on a droop power response and a nominal droop power ratio, wherein the droop power response is calculated based on a gas turbine power output and a speed-load error; and
generate the correction factor to apply to the nominal fuel flow command generated by the droop response system, wherein the correction factor is configured to correct the nominal fuel flow command generated by the droop response system;
wherein the droop response system is configured to determine an actual fuel flow command based at least in part on the correction factor applied to the nominal fuel flow command and to output an actual fuel flow command to control operation of the turbine.

2. The system of claim 1, wherein the proportional droop correction control system is configured to use a gas turbine power estimation from an online model as the gas turbine power output when the turbine system in a single shaft operation.

3. The system of claim 1, wherein the droop response correction system is configured to determine a calculated droop power ratio as the nominal droop power ratio, wherein the calculated droop power ratio is determined based on a rated gas turbine power output and a preset droop level.

4. The system of claim 1, wherein the proportional droop correction control system is configured to use a difference between a speed-load reference and a power grid frequency as the speed-load error.

5. The system of claim 1, wherein the proportional droop correction control system is configured to limit the correction factor within an upper limit, a lower limit, or any combination thereof, by using a clamp, and wherein the correction factor is further limited by using a rate limiter to limit the rate of change of the correction factor.

6. The system of claim 1, wherein proportional droop correction control system is configured to monitor a load level of the turbine system by comparing a speed-load reference to a threshold value, wherein the proportional droop correction control system is configured to update the correction factor when the load level exceeds the threshold value and a set of droop conditions are met and to use a prior correction factor as the correction factor when the load level does not exceed the threshold value.

7. The system of claim 6, wherein the set of droop conditions comprise when an enable bit is enabled, a droop permitted bit is enabled, a single shaft configuration condition is met, and a valid online model condition are met.

8. The system of claim 7, wherein the proportional droop correction control system is configured to use the nominal droop power ratio as the droop power response when the set of droop conditions are not met.

9. The system of claim 6, wherein the set of droop conditions comprise when an enable bit is enabled, a droop permitted bit is enabled, and a single shaft configuration condition is not met.

10. The system of claim 1, wherein the nominal droop power ratio is divided or multiplied by the droop power response as the correction factor.

11. A method, comprising:
receiving a turbine system operating parameter, wherein the turbine system operating parameter comprises an indication of a frequency variation of an electric power system associated with the turbine system;
determining a nominal fuel flow command based on a corresponding magnitude of the frequency variation, wherein the nominal fuel flow command controls operation of the turbine system in proportion to the frequency variation;
determining a correction factor to vary the output of the turbine system according to the frequency variation, wherein the correction factor is based on a droop power response and a nominal droop power ratio, wherein the droop power response is calculated based on a gas turbine power output and a speed-load error;
determining an actual fuel flow command based at least in part on the correction factor applied to the nominal fuel flow command; and
varying the output of the turbine system based at least in part on the actual fuel flow command.

12. The method of claim 11, comprising determining a calculated droop power ratio as the nominal droop power ratio, wherein the calculated droop power ratio is determined based on a rated gas turbine power output and a preset droop level.

13. The method of claim 11, wherein the correction factor is determined without a generator output, megawatt sensor, or any combination thereof.

14. The method of claim 11, comprising dividing the gas turbine power output by the speed-load error as the droop power response, wherein the speed-load error comprises a difference between a speed-load reference and a power grid frequency.

15. The method of claim 11, comprising:
deriving a load level corresponding to a first operating parameter of the turbine system based on a speed percentage value and a frequency percentage value of the turbine system;
comparing the load level to a threshold value;
performing a hold based on the comparison, wherein the hold uses a prior correction factor as the correction factor when the load level is below the threshold value, and wherein the hold uses the correction factor when the load level is above the threshold value.

16. A non-transitory computer-readable medium having computer executable code stored thereon, the code comprising instructions to:
receive a turbine system operating parameter, wherein the turbine system operating parameter comprises an indication of a frequency variation of an electric power system associated with the turbine system;
generate a droop correction factor to apply to a response generated to vary the output of the turbine system according to the frequency variation, wherein the droop correction factor is based on a nominal droop power ratio and a droop power response, wherein the nominal droop power ratio comprises a rated gas turbine output divided by a preset droop level, and wherein the droop power response comprises a gas turbine power output divided by a speed-load error; and
vary the output of the turbine system according to the droop correction factor applied to the response.

17. The non-transitory computer-readable medium of claim 16, wherein the instructions comprise instructions to derive an actual fuel flow command based on the droop correction factor and a nominal fuel flow command as the corrected response, wherein the actual fuel flow command is configured to actuate an actuator, and wherein the actuator is configured to control a flow of a fuel into the turbine.

18. The non-transitory computer-readable medium of claim 16, wherein the instructions comprise instructions to divide the nominal droop power ratio by the droop power response as the droop correction factor.

* * * * *